US008185726B2

(12) United States Patent
Taha et al.

(10) Patent No.: US 8,185,726 B2
(45) Date of Patent: May 22, 2012

(54) SLEEP OPTIMIZATION BASED ON SYSTEM INFORMATION BLOCK SCHEDULING

(75) Inventors: Ali Taha, San Diego, CA (US);
Chih-Ping Hsu, San Diego, CA (US);
Shawn C. Morrison, Boulder, CO (US);
Vivek Ramachandran, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 896 days.

(21) Appl. No.: 11/739,830

(22) Filed: Apr. 25, 2007

(65) Prior Publication Data
US 2007/0260851 A1 Nov. 8, 2007

Related U.S. Application Data

(60) Provisional application No. 60/796,076, filed on Apr. 27, 2006.

(51) Int. Cl.
*H04W 4/00* (2009.01)
(52) U.S. Cl. ........... 713/1; 713/2; 370/318; 370/328; 370/338; 455/458; 455/561
(58) Field of Classification Search ............ 713/1, 2; 370/318, 328, 338; 455/458, 561
See application file for complete search history.

(56) References Cited

U.S. PATENT DOCUMENTS

| 6,973,052 | B2 | 12/2005 | Wang et al. | |
|---|---|---|---|---|
| 7,181,190 | B2 * | 2/2007 | Abhishek et al. | 455/343.4 |
| 7,577,114 | B2 * | 8/2009 | Hsieh et al. | 370/311 |
| 2004/0190467 | A1 | 9/2004 | Liu et al. | |
| 2005/0075147 | A1 * | 4/2005 | Fabien et al. | 455/574 |
| 2005/0085279 | A1 * | 4/2005 | Aoki | 455/574 |
| 2005/0164683 | A1 | 7/2005 | Roberts et al. | |
| 2006/0111127 | A1 * | 5/2006 | Jang | 455/458 |
| 2006/0120530 | A1 * | 6/2006 | Vialen et al. | 380/270 |
| 2006/0187876 | A1 * | 8/2006 | Schmidl et al. | 370/328 |
| 2009/0117853 | A1 | 5/2009 | Ishii et al. | |

FOREIGN PATENT DOCUMENTS

| CN | 1462122 | | 12/2003 |
|---|---|---|---|
| CN | 1694556 | A | 11/2005 |
| EP | 1592272 | | 11/2005 |
| JP | 2004504783 | | 2/2004 |
| JP | 2005323369 | A | 11/2005 |
| JP | 2007116639 | A | 5/2007 |

(Continued)

OTHER PUBLICATIONS

Written Opinion—PCT/US2007/067678, International Search Authority—European Patent Office—Nov. 6, 2008.

(Continued)

*Primary Examiner* — Abdelmoniem Elamin
(74) *Attorney, Agent, or Firm* — Kevin T. Cheatham

(57) ABSTRACT

Methods and apparatuses are presented for sleep optimization based on system information block SIB scheduling. A method for invoking sleep states within user equipment (UE) is presented. The method includes decoding a broadcast control channel with a cell, determining a System Information Block (SIB) schedule associated with the cell, determining a sleep time interval based upon the SIB schedule, and placing the UE in a sleep state using the sleep time intervals. An apparatus for invoking sleep states within UE is presented. The apparatus includes logic configured to decode a broadcast control channel with a cell, logic configured to determine a SIB schedule associated with the cell, logic configured to determine a sleep time interval based upon the SIB schedule, and logic configured to place the UE in a sleep state using the sleep time intervals.

27 Claims, 11 Drawing Sheets

FOREIGN PATENT DOCUMENTS

| TW | 200401574 | 1/2004 |
| WO | WO0207459 A2 | 1/2002 |
| WO | 03096580 | 11/2003 |

OTHER PUBLICATIONS

International Search Report—PCT/US07/067678, International Search Authority—European Patent Office—Nov. 22, 2007.

3rd Generation Partnership Project; Technical Specification Group Radio Access Network; Radio Resource Control (PRC); Protocol Specification (Release 5), 3GPP TR 25.331 V5.0.0 (Mar. 2002) Technical Specification, Apr. 4, 2004 http: //www.3gpp.org/ftp/specs/archive/25_series/25.3 31/ 8.1.1.1.1 - 8.1.1.6 - 8.1.1.7.3 - 10.2.48.8.6.

Taiwan Search Report—096115134—TIPO—Jul. 6, 2011.

\* cited by examiner

SLEEP OPTIMIZATION BASED ON SYSTEM INFORMATION BLOCK SCHEDULING

CLAIM OF PRIORITY UNDER 35 U.S.C. §119

The present Application for Patent claims priority to Provisional Application No. 60/796,076 entitled "INCREASING DYNAMIC STANDBY TIME BY REDUCING IDLE MODE POWER CONSUMPTION THROUGH INTER-SIB SLEEP FEATURE FOR UMTS PHONES" filed on Apr. 27, 2006, and assigned to the assignee hereof and hereby expressly incorporated by reference herein.

FIELD OF DISCLOSURE

The embodiments of the disclosure relate generally to wireless communications processing and more specifically to processing which may enhance the battery life of mobile communication devices.

BACKGROUND

With the increasing popularity of third generation high-speed wireless services and the multifunctional mobile devices that enable them, it can be expected that the daily usage time may continue to rise. As users become more accustomed to anytime-anywhere high speed data network access, the battery life of mobile devices may be a driving factor in determining the usage time. Consequently, the battery life will likely rise in importance as one of the major selling points for individuals making purchasing decisions. Market research indicates that consumers realize that powerful, new applications may involve extending battery life, and these consumers will likely be demanding these improvements.

In addition to improvements in battery technology, current efforts to extend battery life focus around various aspects of the design of mobile devices affecting battery consumption. Examples of such efforts can include improvements in the energy efficiency of radio-frequency (RF) components, displays, and digital electronics including various processors and logic circuits.

In parallel to these endeavors, there may be additional room for battery life improvement by the optimization of the mobile device sleep cycles. There are several factors which may play a role in the dynamics of the sleep cycles of mobile devices in Universal Mobile Telecommunications System (UMTS) networks. Some of these factors have been standardized, while others may depend on the particular implementations on the network and on a particular mobile device.

However, conventional techniques have not yet taken advantage of all of the implementation-specific mechanisms which can affect the sleep cycle during mobile device idle modes and therefore extend their battery life.

Accordingly, it would be beneficial to implement techniques within a mobile device, which are adaptable to a variety of UMTS networks and which can extend the operational time of the mobile device's battery.

SUMMARY

Embodiments disclosed herein provide for methods and apparatuses for sleep optimization based on system information block scheduling.

A method for invoking sleep states within user equipment (UE) is provided. The method includes decoding a broadcast control channel from a cell, determining a System Information Block (SIB) schedule associated with the cell, determining a sleep time interval based upon the SIB schedule, and placing the UE in a sleep state using the sleep time interval. Embodiments of the method may include further reading a Master Information Block (MIB) to determine the SIB schedule, and reading a Scheduling Block (SB) to further determine the SIB schedule when the SIB schedule information is not contained in the MIB; further associating System Frame Numbers (SFN) with each SIB based upon the SIB schedule, establishing a SIB scheduling database, populating the SIB scheduling database with a SIB scheduling bit map, and computing a plurality of distances based upon the SIB scheduling bit map, wherein each distance represents a duration of time between adjacent SIB which are to be decoded; and further determining whether a distance within the plurality of distances exceeds a threshold, and if a distance exceeds a threshold, the method further includes determining whether a conflict exits within the distance, establishing a sleep time based upon the distance if a conflict does not exist, and establishing at least one modified sleep time if a conflict does exist.

An apparatus for invoking sleep states within user equipment (UE) is presented.

The apparatus includes logic configured to decode a broadcast control channel with a cell, logic configured to determine a System Information Block (SIB) schedule associated with the cell, logic configured to determine a sleep time interval based upon the SIB schedule, and logic configured to place the UE in a sleep state using the sleep time intervals. Other embodiments of the apparatus may include further logic configured to read a Master Information Block (MIB) to determine the SIB schedule, and logic configured to read a Scheduling Block (SB) to further determine the SIB schedule when the SIB schedule information is not contained in the MIB; further logic configured to associate System Frame Numbers (SFN) with each SIB based upon the SIB schedule, logic configured to establish a SIB scheduling database, logic configured to populate the SIB scheduling database with a SIB scheduling bit map, and logic configured to compute a plurality of distances based upon the SIB scheduling bit map, wherein each distance represents a duration of time between adjacent SIB which are to be decoded; and further logic configured to determine whether a distance within the plurality of distances exceeds a threshold, and if a distance exceeds a threshold, the apparatus further includes logic configured to determine whether a conflict exits within the distance, logic configured to establish a sleep time based upon the distance if a conflict does not exist, and logic configured to establish at least one modified sleep time if a conflict does exist.

Accordingly, it would be beneficial to implement techniques within a mobile device, which are adaptable to a variety of UMTS networks and which can extend the operational time of the mobile device's battery.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
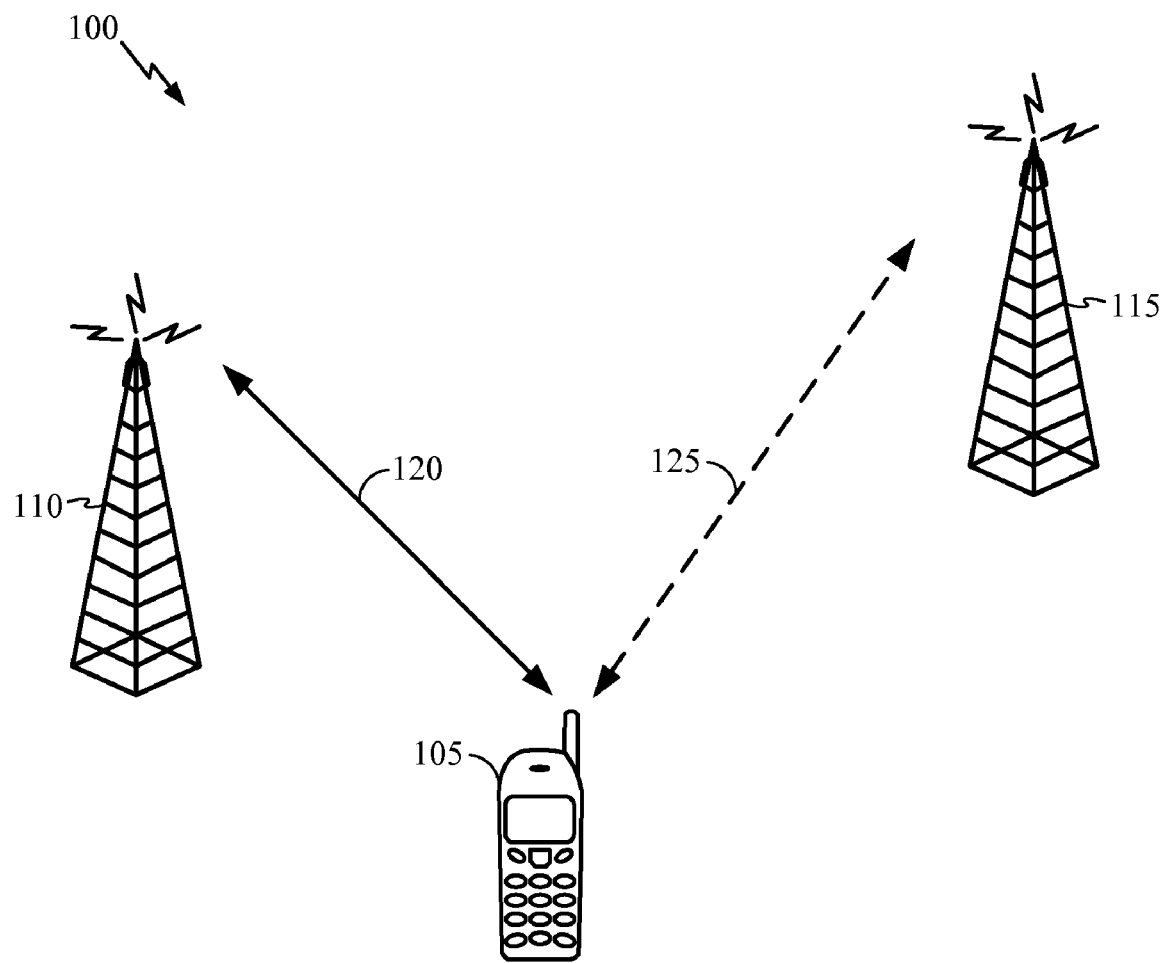
FIG. 1 is a top-level system diagram showing a configuration having a serving cell, a neighboring cell, and a User Equipment (UE) device.

FIG. 1 is a diagram showing an exemplary Universal Mobile Telecommunications System (UMTS) network 100 which may include a serving cell 110, one or more a neighboring cells 115 (only one neighboring cell is shown for simplicity), and a User Equipment (UE) device 105. The UE 105 may be in communications with both the serving cell 110 and the neighboring cell 115 across various air interfaces or channels. The UE 105 may exchange data with serving cell 110 across a control channel and/or traffic channels 120 as is well known in the art. The UE 105 may remain in communications over the control channel and/or traffic channels 120 with the serving cell 110 while the UE 105 remains within an area that supports adequate signal strength. The UE 105 may also maintain contact with one or more neighboring cells 115 over the neighbor's control channel 125 to evaluate the neighboring cell that would be the best candidate for becoming the next serving cell. For example, as the UE 105 moves within range of the neighboring cell 115, it can perform a cell reselection process based on the relative quality of the signals being received from all of the cells. The outcome of the process of evaluation of the quality of the serving cell 110 and neighboring cell 115 may be either to remain serving on the serving cell 110, or the decision to reselect to the neighbor cell 115. This evaluation process may be standardized by using standard cell reselection parameters which are known in the art. These parameters may include the signal quality thresholds for initiating measurements of the neighboring cell 115 signals, and signal quality thresholds, and/or histeresis offsets for triggering reselection to a new cell. If the UE 105 decides to reselect and establish neighboring cell 115 as the new serving cell, the UE 105 can read various system information packets broadcast over a control channel. The system information packets and the control channel are described in more detail in the description of FIG. 2.

One mode that the UE 105 may be in is an idle mode, which may be characterized by the absence of a signaling connection with the UMTS network 100. While in idle mode, the UE 105 may either be in a sleep state or in a wake-up state. In the sleep state, the UE 105 shuts down its RF circuitry, and maintains no physical channels. The UE 105 may periodically go into the wake-up state in order to demodulate a Paging Indicator Channel (PICH) and evaluate the signal quality of the serving cell 110 and the neighboring cell 115. The UE 105 may go into the wake-up state during its periodic paging occasions, whose timing conventionally depends on the UE 105 identifier called IMSI (International Mobile Subscriber Identity). This approach may provide an equal spread of paging occasions in time. The frequency of paging occasions may be determined by a network parameter. For example, in one embodiment, a DRX Cycle Coefficient may be used and may be included in the system information broadcast on a specific channel called a Broadcast Control Channel (BCCH) to all devices in a given cell.

Further referring to FIG. 1, the UMTS network 100 may be a high speed, packet based, data network carrying voice, video, audio, text, and/or any other known types of data. The UMTS network 100 may be, for example, a third generation Code Division Multiple Access (CDMA) network. The UMTS network 100 may be accessed using UEs taking a variety of different forms. The UE 105 shown in FIG. 1 is a cellular telephone. However, the UE may not be limited to the illustrated device, and can also be any device which connects to the UMTS network, such as, for example, a personal digital assistant, a pager, and/or a separate computer platform that has a wireless communication portal. More than one UE device may be simultaneously in communication with the serving cell 110 and the neighboring cell 115.

Figure 2:
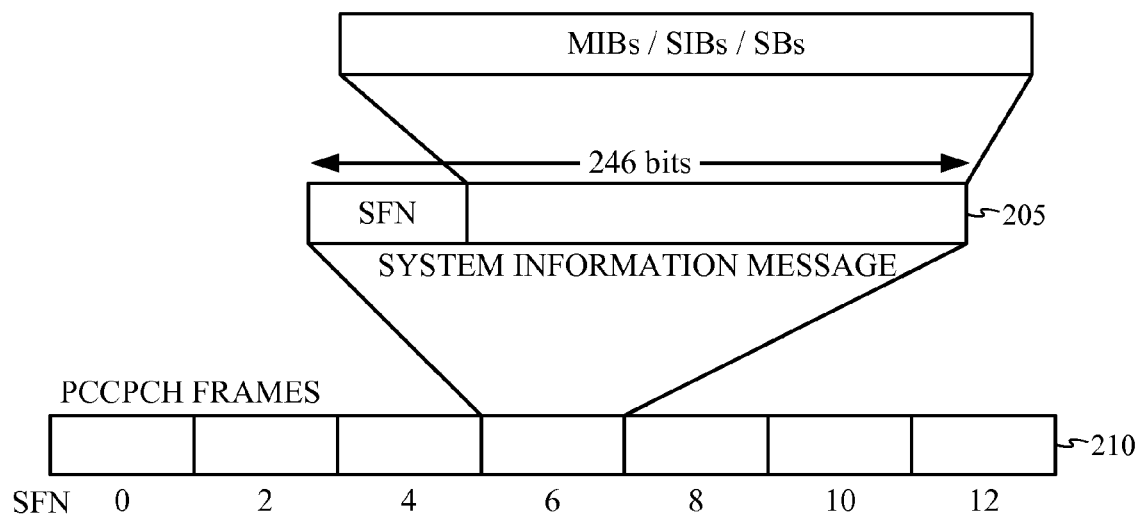
FIG. 2 is a diagram showing the relationships and structures of information blocks which may be provided over a Broadcast Control Channel (BCCH).

FIG. 2 illustrates the relationships and structures of the various information blocks which may be provided over a Broadcast Control Channel (BCCH) in embodiments of the invention. When performing cell reselection and prior to camping on a neighboring cell 115, the UE 105 can first read the system information messages from the neighboring cell 115 over the neighboring BCCH (hereinafter N-BCCH). The system information messages 205 may be partitioned into a fixed size (e.g., 246 bits in various embodiments) and can be may be associated with a System Frame Number (SFN). The SFN may be a sequential counter that can repeat after reaching a predefined value, and be associated with a fixed time value (e.g., 10 ms in some embodiments). Each system information message may be associated with one or more SFNs (e.g., in some embodiments, a system information message may correspond to two SFNs, thus having a 20 ms duration). In the example depicted in FIG. 2, each system information message 205 is transmitted every 20 ms, thus the SFN values increment by even values. A stream 210 of system information messages 205 may be received by the UE 105 through a Primary Common Control Physical Channel (PCCPCH) within a physical layer (L1) of the UE 105 (discussed more in detail in FIG. 5). The system information message 205 may encapsulate and segment different types of information, which may include System Information Blocks (SIBs), Master Information Blocks (MIBs), and/or Scheduling Blocks (SBs), as is well known in the art.

The SIBs provide the UE 105 with system information such as cell ID, core network domain information, UE timers, constants, and other parameters that can be used to establish a connection to the neighbor cell. The SIBs may be classified into various types, and their size may vary depending upon the information they contain.

The SIBs may be broadcast throughout the cell on a periodic basis, and a single SIB may be segmented across multiple system information messages 205. The MIBs contain information about the scheduling of the SIBs, including the repetition count, number of segments, SFN of the first segment and SFN offset for the remaining segments (if any) for each of the SIBs. Sometimes, in addition to MIB, the BCCH may include scheduling blocks (SB) which may contain the information for SIBs that have not been included in the MIB.

Figure 3:
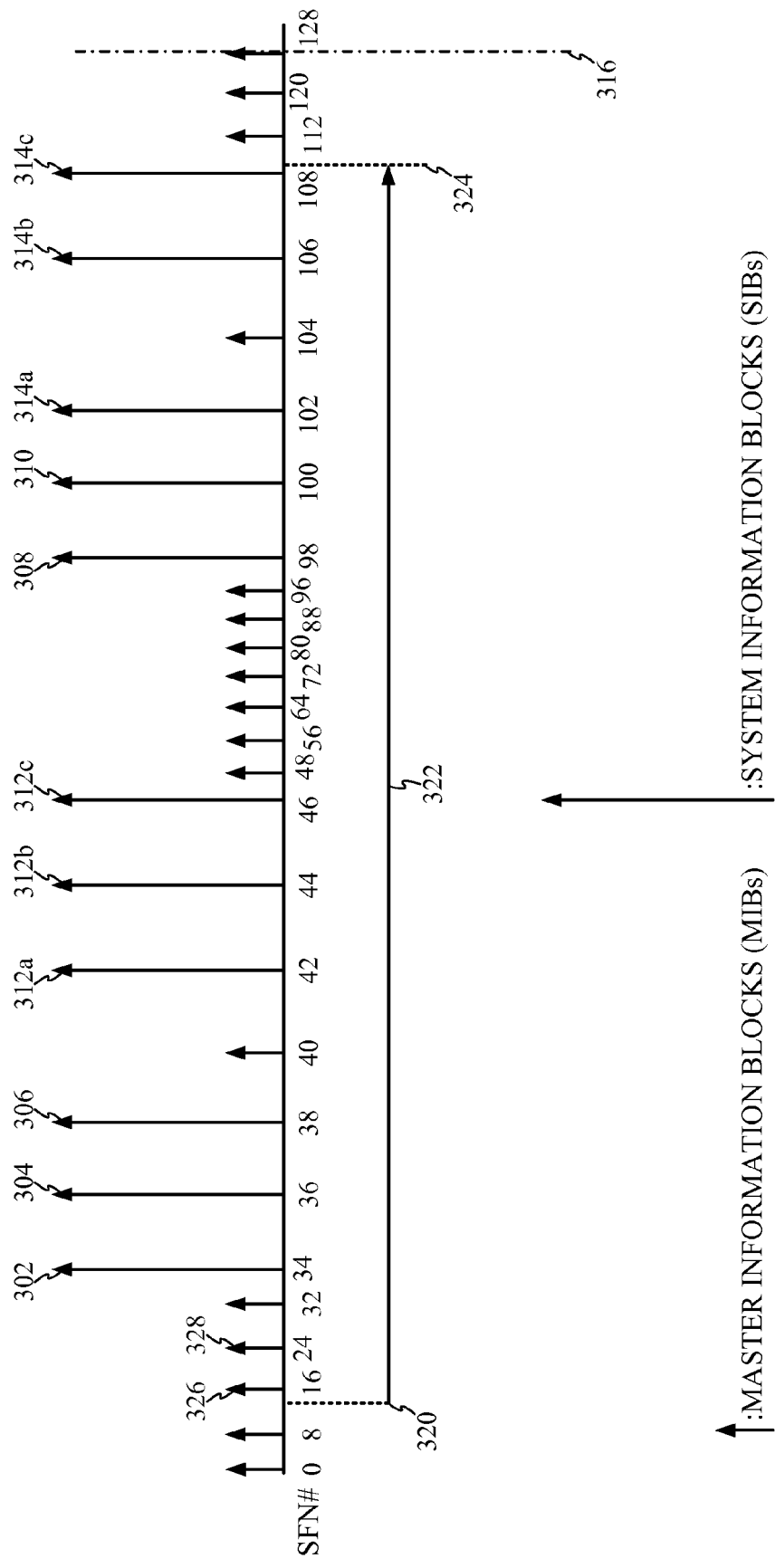
FIG. 3 is a temporal diagram showing the sleep states of a conventional UE which does not sleep during gaps in the transmission of System Information Blocks (SIB).

FIG. 3 is a diagram showing the conventional sleep states of a UE for an exemplary network. The numbers running along the horizontal axis correspond to SNF numbers, and in this example, each SNF increment may correspond to 10 ms. Each MIB is represented by a short vertical arrow, and can be repeated every 80 ms. Each SIB is represented by a long vertical arrow. Because the size of SIBs may vary depending on the information they carry, some SIBs (e.g., 302-310) may be contained in one N-BCCH frame. In other cases, when the SIBs may be too large for one N-BCCH frame, the SIBs may be segmented and transmitted over several N-BCCH frames (e.g., SIBs 312a-312c and 314a-314c). The segmented SIBs, as shown for SIBs 314a-314c, do not have to be adjacent to one another. All of the SIBs may be repeated periodically within a period called a repetition count. The repetition count may be expressed in a number of system frames, and will vary depending upon the size of the particular SIB. In this example, SIBs 302-310 consist of one segment each, and have a repetition count of 64. SIBs 312a-312c and 314a-314c consist of three segments each, and have a repetition count of 128. In this example, all of the SIBs will be transmitted at least once over the SNF values from 1 to 128. Therefore, collecting all of the SIBs may have the UE 105 listening, at a minimum, over a period of time denoted by the dashed vertical line 316.

The UE 105 may collect SIBs upon the following events: when UE 105 is powered-up; when an MIB value tag changes; when an out-of-service condition occurs; or any other condition when a cell selection/reselection occurs. Each time the UE 105 reselects to a neighboring cell 115 whose valid system information it does not have, the UE 105 can collect the SIBs of the neighboring cell 115. Upon reselection to a new cell, the UE 105 should collect the SIBs that carry the system information required for the operation in idle mode. The UE 105 may be configured to postpone reading other system information blocks until the content is needed. Decoding and managing of the information broadcasted on the N-BCCH is the task of the Radio Resource Control (RRC) layer in the UE. The RRC can read the SIB scheduling info from MIBs, collect and reassemble SIB segments, and decode the system information parameters contained therein. The RRC layer is discussed in further detail below in the description of FIG. 5.

Further referring to FIG. 3, a conventional sleep algorithm is described for a UE. At point 320, the UE woke up from a sleep state. The duration of time it may take for the UE to awaken will likely prevent it from being able to read MIB 326; however, the UE should be fully awake to read MIB 328 and obtain the scheduling information for the subsequent SIBs. Because the UE is using a conventional sleep algorithm, it will stay awake for the entire duration 322. Once the last SIB 314c is collected, the UE will go to sleep at time period 324 to conserve power. Using a conventional sleep algorithm, the UE stayed awake during the entire SIB collection time. Therefore, the UE may spend more time than necessary in the awakened state, thus draining the battery faster. Moreover, if there are any errors in decoding any of the SIBs, the UE 105 may remain awake even for a greater period of time, thus taxing the battery even further.

Figure 4:
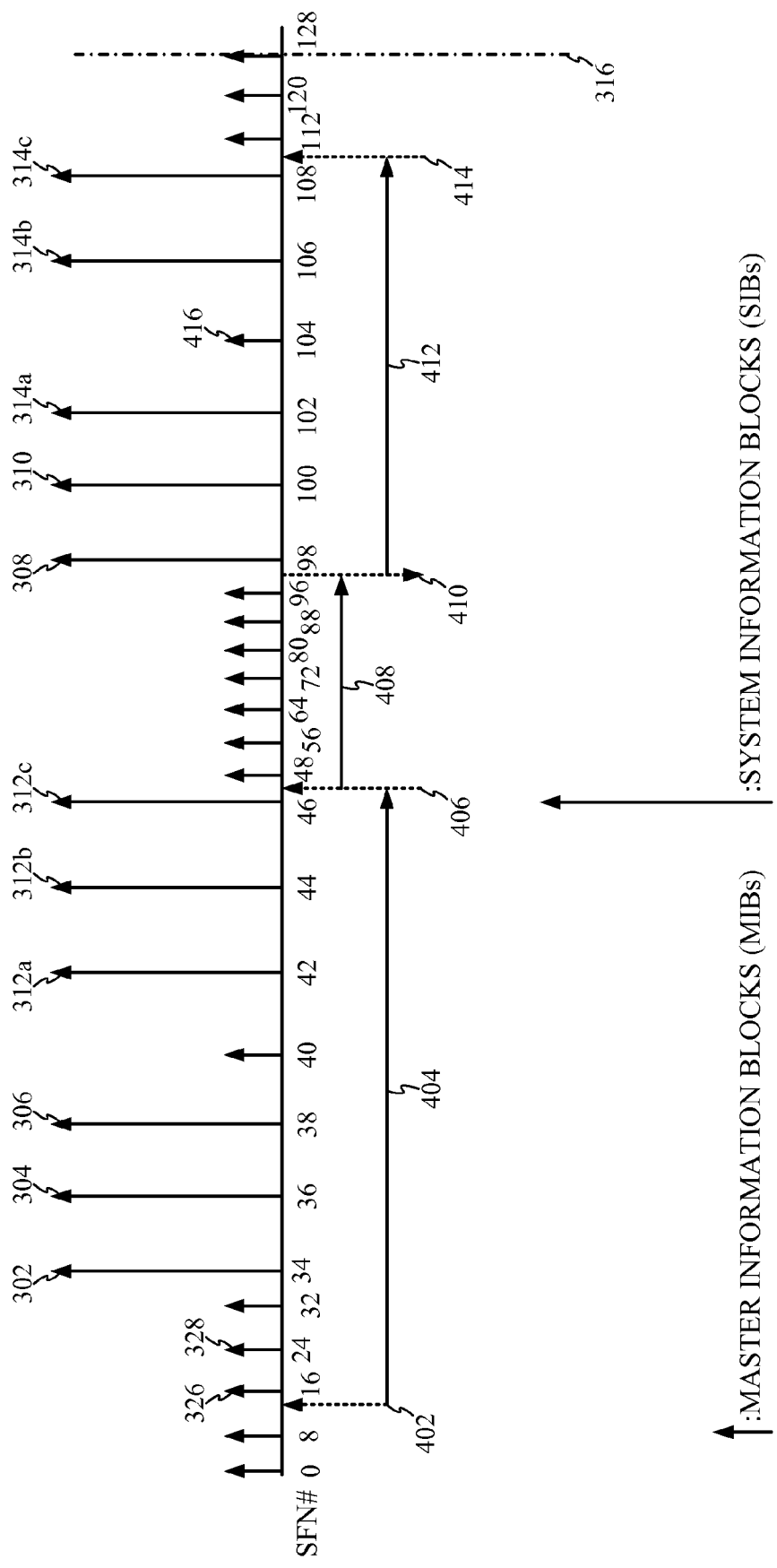
FIG. 4 is an exemplary temporal diagram showing the sleep states of a UE consistent with an embodiment of the invention which may sleep during the gaps between SIB transmissions.

FIG. 4 is a diagram showing the sleep states of a UE in an embodiment of the invention using the exemplary network configuration shown above in FIG. 3. In accordance with embodiments of the invention, the SIB collection process can allow the UE 105 to go into a sleep state between reading SIBs.

Referring to FIG. 4, initially, the UE 105 may wake up from a sleep state and start demodulating the neighboring cell's 115 BCCH (denoted as N-BCCH) at time 402. The UE 105 may not have enough time to acquire MIB 326, and may thus first acquire MIB 328 at SFN 24. Once demodulated, the MIB 328 can provide scheduling information for the SIBs within the acquisition period denoted at time 316 (corresponding to SNF 128). The UE 105 will stay awake for period 404 to collect SIBs 302-306 and 312a-312c. At point 406, UE 105 may go into a sleep state for time period 408 and avoid reading the MIBs being rebroadcast at SFN 48 through SFN 96. At point 410, UE 105 may wake up to read the remaining SIBs 308-310 and 314a-314c. Note that UE 105 may remain awake throughout the entire time period 412, even though demodulating MIB 416 may be redundant. This is because their may not be enough time for UE 105 to execute a sleep-wake cycle in the time span between SFN 102 and SFN 106. At time 414 UE 105 has read the SIBs and can enter a sleep state. The SIBs from the neighboring cell may be used during the UE's idle mode operation for monitoring the neighboring cell 115

In summary, embodiments of the invention allow the UE 105 to detect the time gaps of sufficient length during SIB acquisition and use them as opportunities to go into sleep state without missing SIBs. This process is referred to herein as Inter-SIB Sleep Optimization (ISSO). ISSO can prevent the UE 105 from remaining in the wake-up state longer than necessary to acquire the desired SIB information. The SIB scheduling scheme used in UMTS networks can affect the battery life of mobile devices, with or without the ISSO. However, ISSO may improve the UE 105 standby battery life for any given SIB scheduling scheme. Since SIB scheduling schemes are not specified in the UMTS standard specifications, they may vary significantly among commercial networks. In another embodiment, ISSO may be used to read SIB segments. SIBs may be segmented into multiple blocks (e.g., 312a-312c and 314a-314c) if their size exceeds the space constraints of a single block. In these situations, one embodiment of the ISSO can track the collection of the SIB segments as they are encountered, as opposed to only tracking the aggregated SIB after all of the segments have been collected. This approach may permit the UE 105 to further sleep time as it obviates the recollection of SIB segments which may be available over several cycles.

Embodiments of the invention can automatically adapt to work with the SIB scheduling of any UMTS network, including currently-deployed commercial networks. Accordingly, the MIB and SIB structure shown in FIG. 4 is merely exemplary, and that embodiments of the invention can adapt to other networks having other MIB and SIB configurations.

Figure 5:
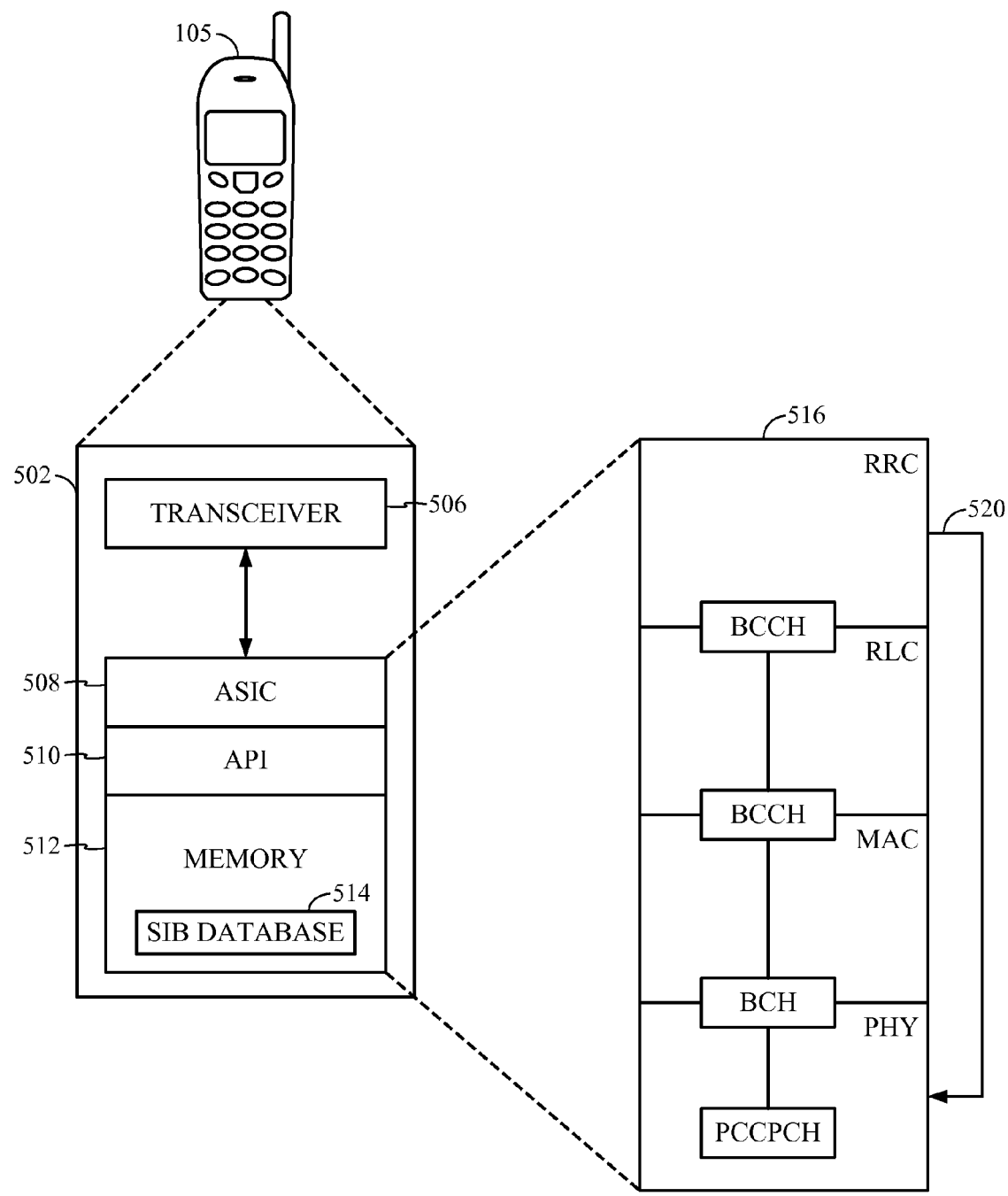
FIG. 5 is a diagram of an exemplary UE and an exemplary block diagram showing the UEs main components.

FIG. 5 is a diagram of an exemplary UE 105 and an exemplary block diagram showing the components of UE 105. Embodiments of the invention can thus be realized on any form of UE 105 which may perform digital communications over UMTS network 100. For example, the UE can be any devices having wireless communication capabilities, including without limitation, wireless modems, PCMCIA cards, personal computers, telephones, or any combination or subcombination thereof.

An exemplary UE 105 is shown in FIG. 5 in the form of a cellular telephone. The UE 105 may have a platform 502 that can exchange data and/or commands with the UMTS Network 100. The platform 502 can include a transceiver operably coupled to an application specific integrated circuit ("ASIC" 508), or other processor, microprocessor, logic circuit, or other data processing device. The ASIC 508 or other processor executes the application programming interface ("API") 510 layer that interfaces with any resident programs in the memory 512 of the wireless device. The memory 512 can be comprised of read-only or random-access memory (RAM and ROM), EEPROM, flash cards, or any memory common to computer platforms. The platform 502 also can include a SIB scheduling database 514 which may be used in the ISSO process and is described in more detail below. Exemplary communication protocol layers 516 in the wireless network may also reside in the platform and which may execute various commands and processes at different layers. The communication protocol layers may include a Radio Resource Control (RRC) layer, a Radio Link Control (RLC) layer, a Medium Access Control (MAC) layer, and a Physical Layer (L1). Information received the physical layer (e.g., Primary Common Control Physical Channel (PCCPCH)) may be decoded and transferred between the various layers MAC RLC and RRC (e.g., Broadcast Channel (BCH), Broadcast Control Channel (BCCH)) as is known in the art. Conventionally, the information passes from layer to layer in a sequential manner. However, in various embodiments of the invention, a direct interface 520 may be provided between RRC and L1 in order to share scheduling information via the SIB scheduling bit map. Such embodiments may have the RRC decode the SIBs, determine the SIB scheduling information, and subsequently generate the SIB Scheduling bit map. Interface 520 may be used by the RRC initially pass the SIB scheduling bit map to L1, and subsequently inform L1 regarding successful decoding of SIBs so that the SIB scheduling bit map may be updated accordingly. This provides the opportunity to further sleep time by avoiding the decoding of previously decoded SIBs. Scheduling information may contain offsets, repetition periods, and the number of segments of the different SIB types.

However, alternative embodiments may involve determining the SIB scheduling information in any other layer and/or location. For example, other embodiments may have L1 compute the SIB scheduling information if the UE 105 has sufficient processing resources to perform this task. Because the broadcast time of the MIB may be periodic (SFN Mod 8=0), L1 may know the MIBs "position," and can decode the SIB schedule itself to determine the SIB scheduling bit map without the aid of the RRC. Such embodiments may reduce communications overhead between RRC and L1, and thus potentially affording the UE 105 a greater amount of sleep time.

Accordingly, an embodiment of the invention can include the UE 105 including the ability to perform the functions described herein. The various logic elements can be embodied in discrete elements, software modules executed on a processor or any combination of software and hardware to achieve the functionality disclosed herein.

For example, ASIC 508, memory 512, and API 510 may all be used cooperatively to load, store and execute the various functions disclosed herein and thus the logic to perform these functions may be distributed over various elements. Alternatively, the functionality could be incorporated into one discrete component. Therefore, the features of the UE 105 in FIG. 5 are to be considered merely illustrative and the invention is not limited to the illustrated features or arrangement.

Figure 6:
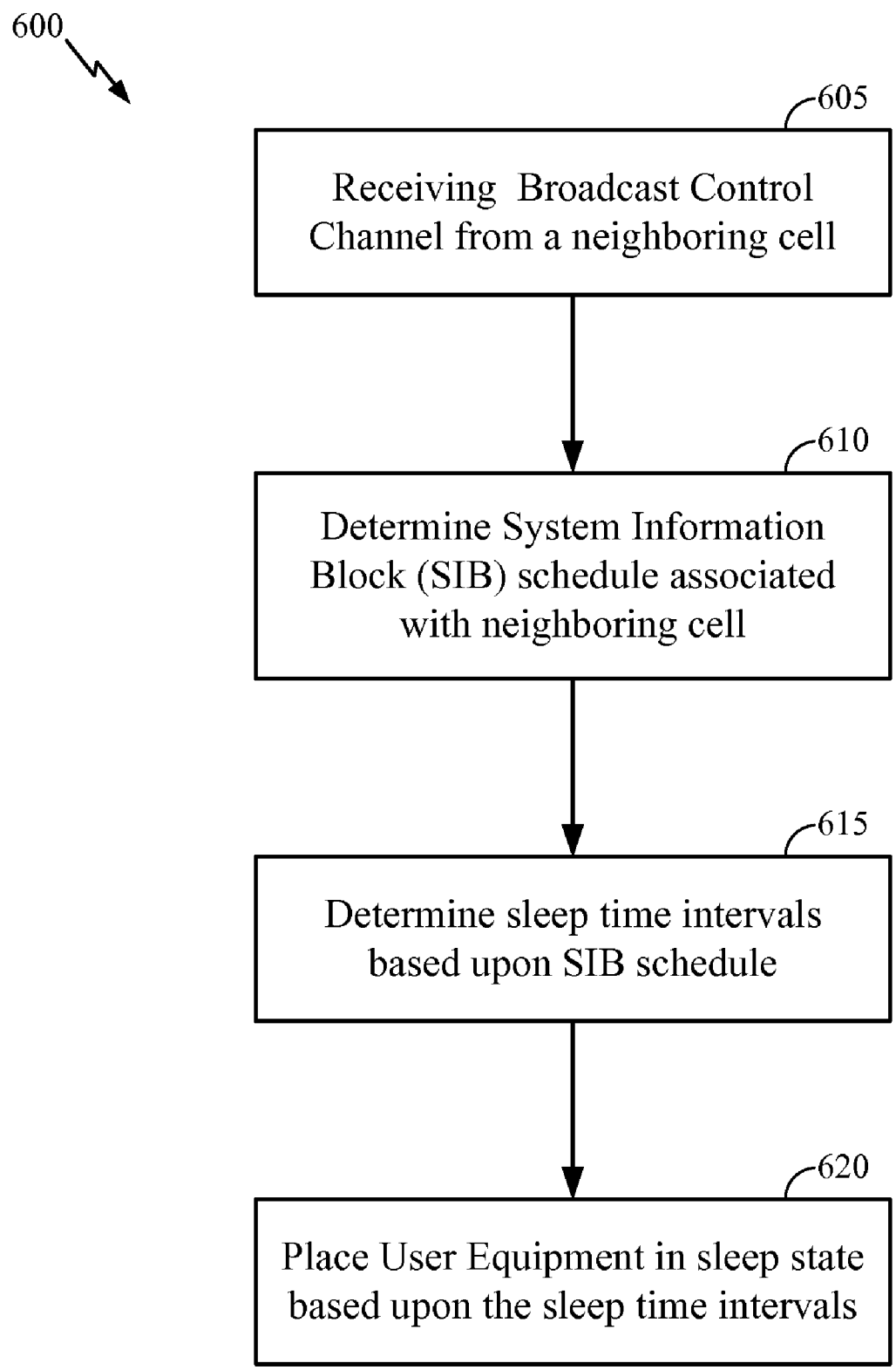
FIG. 6 is a top-level flowchart showing the overall flow of the Inter-SIB Sleep Optimization (ISSO) process.

FIG. 6 is a flowchart illustrating the overall flow of the Inter SIB Sleep Optimization (ISSO) process. The process can start by having the UE 105 receive an N-BCCH from a neighboring cell 115 (605) which may allow the initial acquisition thereof through a process called neighbor acquisition full search. Subsequent acquisitions of the neighboring cell 115, defined herein as a neighbor reacquisition list search, can occur when the UE 105 awakens from a sleep state using information previously obtained from the neighbor acquisition full search. The use of the previously acquired information may allow the UE 105 to reacquire the neighboring cell 115 faster. If the neighbor reacquisition list search fails a predetermined number of times, the UE 105 may optionally conduct another neighbor acquisition full search to acquire the neighboring cell 115.

Over the N-BCCH, the UE 105 can receive various system information messages (e.g., MIBs and SBs as discussed above) so the UE 105 may then determine a SIB schedule associated with the neighboring cell 115 (610). From information derived from the SIB schedule, sleep time intervals for the UE 105 may be determined based upon the various SIBs to be acquired and the delays in the UE 105 (see FIGS. 8A and 8B for details) (615). The UE 105 may then be placed in sleep states based upon the sleep time intervals (620). This may be accomplished by having L1 place various portions of the UE's hardware into a low power/sleep state (e.g., powering down the transceiver/RF circuitry).

Figure 7:
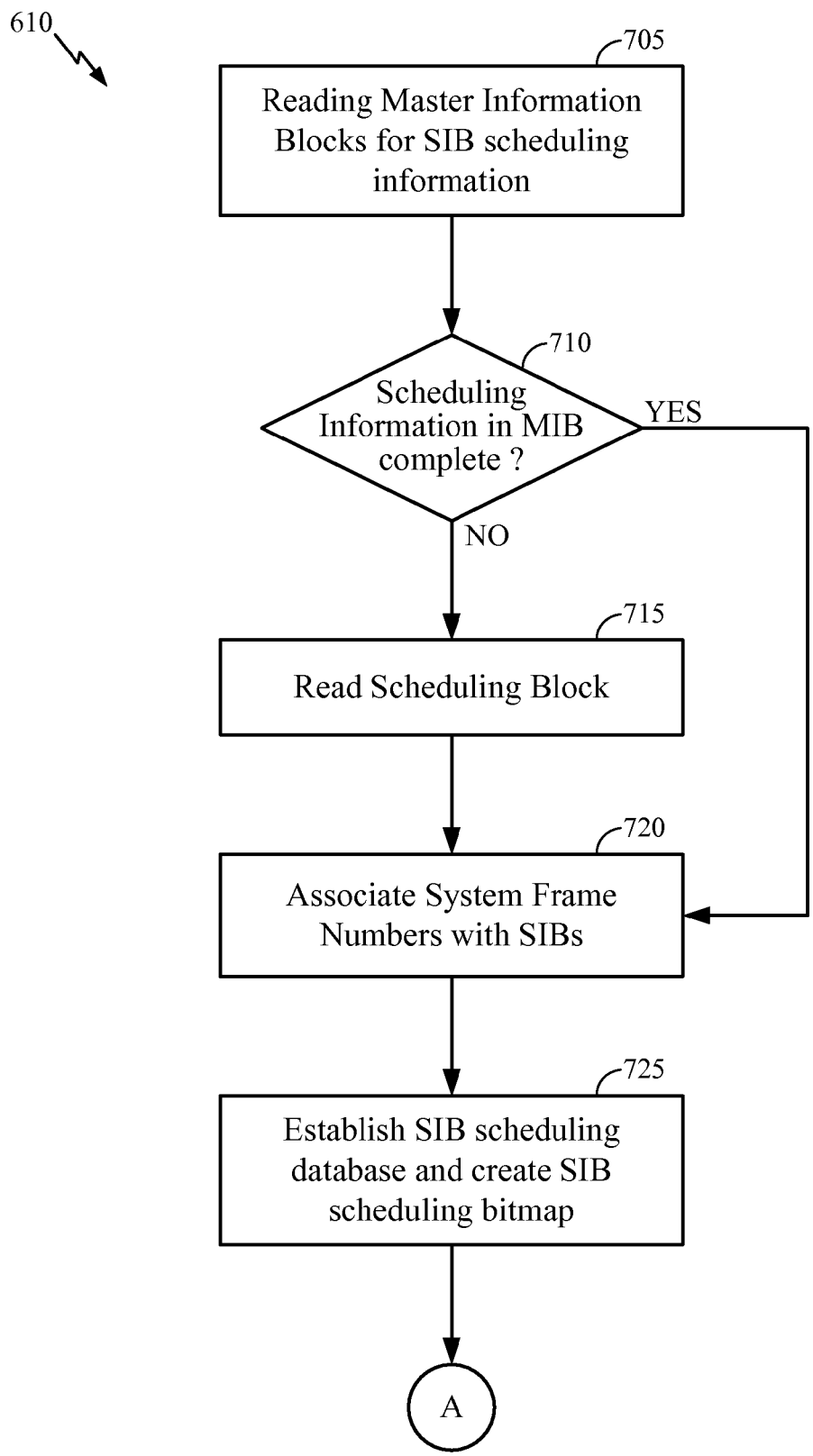
FIG. 7 is a flowchart showing the initial blocks of the ISSO process.

FIG. 7 is a flowchart illustrating exemplary embodiments of determining the SIB schedule (e.g., block 610) of the Inter SIB Sleep Optimization (ISSO) process 600. The UE 105 may initially read a MIB to determine the complete SIB schedule (705). If the SIB scheduling information in the MIB is not complete, the MIB may further indicate the presence of Scheduling Blocks (SB) which contain further SIB scheduling information. The UE 105 may read one or more subsequent SIBs which may be transmitted over the BCCH. Once the SIB scheduling information is available for the SIBs to be acquired, the UE 105 may associate System Frame Numbers (SFN) with each of the SIBs identified from the MIB (and SB, if block 710 determined this was necessary) (720). Once the UE 105 has the scheduling information and the associated SFNs, it may establish an SIB scheduling database (e.g., 514 stored in UE memory 512). In another embodiment, the UE 105 may establish the SIB scheduling database even before decoding SBs, based on the information in the MIB. Then, once a SB is decoded, the UE 105 can update the SIB scheduling database. The SIB scheduling database may be populated with the SIB scheduling bitmap (725). The SIB scheduling bitmap may be a table having a plurality of (e.g., 2048) memory locations, with each location containing, for example, either a "1" or a "0". Having a "1" in location n can imply that the UE 105 should decode the N-BCCH starting at SFN 2n. Having a "0" in location n may indicate that the UE 105 does not need to decode SFNs 2n and 2n+1. When a SIB or SB is expected to be repeated more than once through one SFN cycle, the UE 105 may assign 0 to all locations at which the N-BCCH does not need to be decoded. In one embodiment, the RCC layer may compute the SIB scheduling bitmap and subsequently provide it to L1 through pipe 520. Appendix A is a detailed example of one embodiment for computing the SIB scheduling bitmap.

Figure 8A:
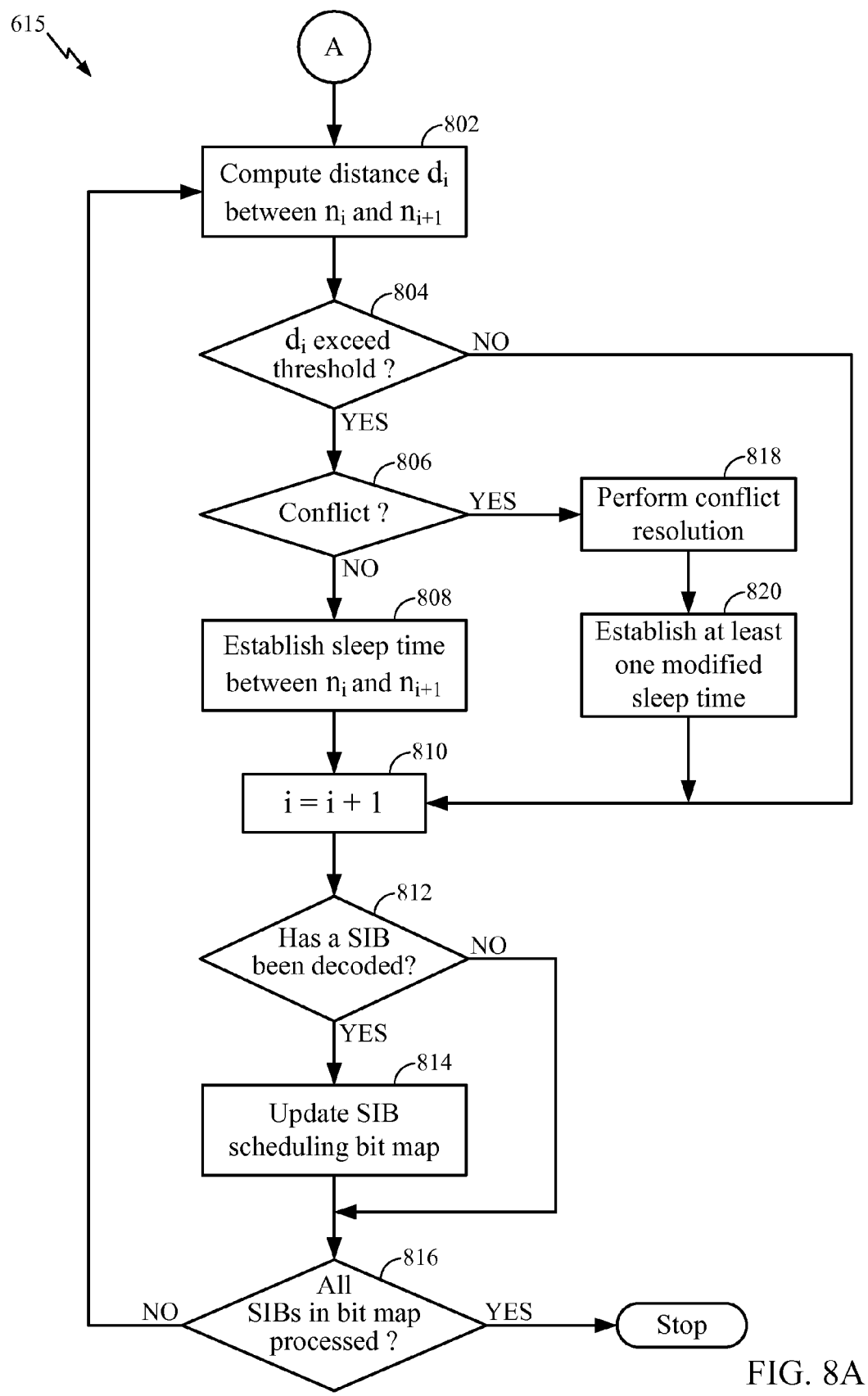
FIG. 8A is a flowchart showing further blocks of the ISSO process.

FIG. 8A is a flowchart showing further details of determining a sleep time interval (e.g., block 615 associated with the Inter SIB Sleep Optimization (ISSO) process 600). Once the SIB Scheduling bitmap is determined, UE 105 may compute a distance ($d_i$) which represents a duration of time between SIBs which are to be decoded. Distances between SIBs may be computed by using the SFN associated with each SIB. Since each SFN can also be associated with a fixed time value (e.g., one SFN may correspond to 10 ms), differences between SFN values may be scaled to time. A distance $d_i$ may be computed for each adjacent SIB described in the MIB.

Figure 8B:
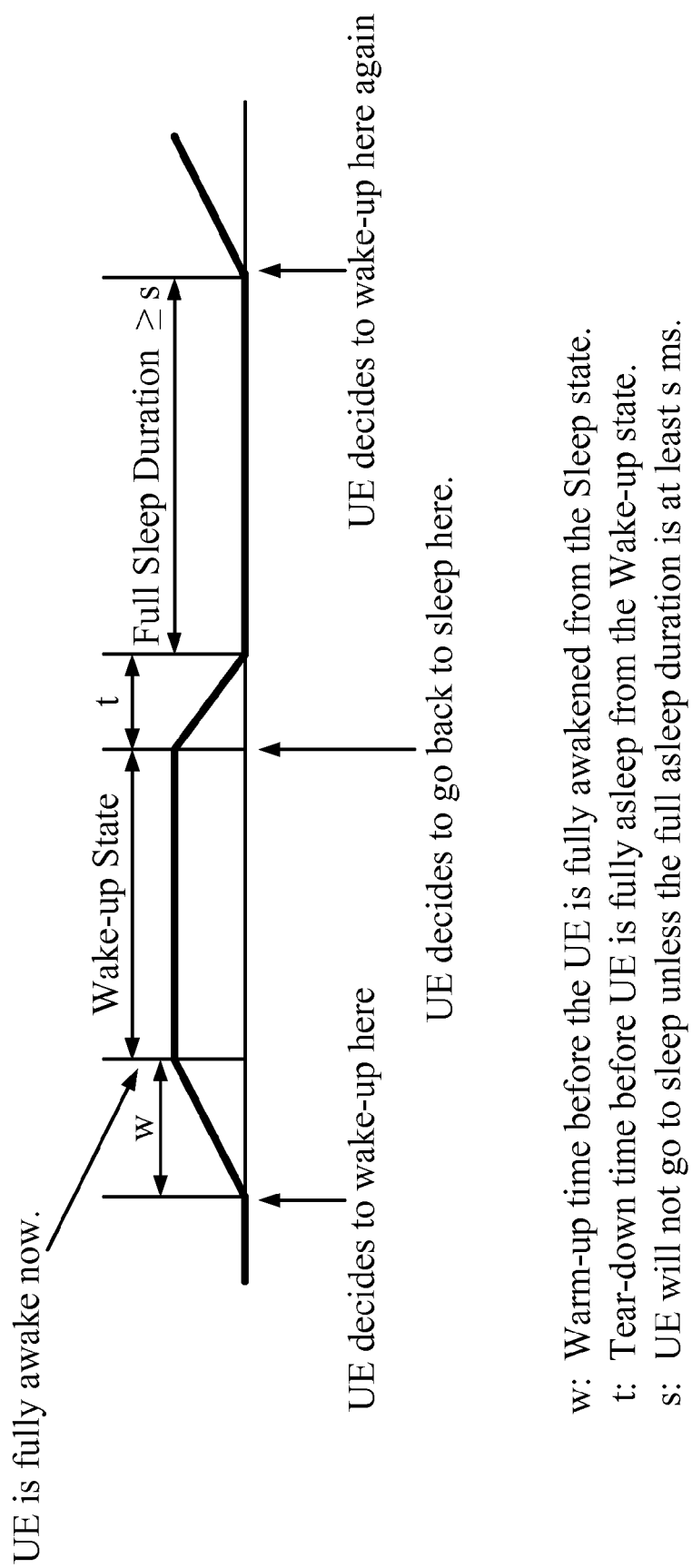
FIG. 8B is a diagram depicting wake-up and tear-down times.

A check may then be performed to determine if $d_i$ exceeds a threshold (804). The threshold may be based upon the warm up time before the UE 105 is fully awake, the tear down time before the UE 105 is fully asleep from the wake-up state, and a preset threshold for full asleep duration. FIG. 8B is an illustration depicting a generalized wake-up and tear-down cycle. The warm up time, w, is the amount of time the UE 105 may take to transition from the sleep state to the awake state. The tear down time, t, is the amount of time the UE 105 may take to transition from the awake state to the sleep state. The predetermined threshold value, s, is the minimum amount of time the UE 105 may sleep. In some embodiments, the wake up time w may be 40 ms, the tear-down time t may be 30 ms, and the threshold value s may be 10 ms. Other embodiments may utilize different values for w, t, and s, which may depend upon the specific characteristics of the various embodiments of the ISSO and/or the UMTS network itself.

Further referring to FIG. 8A, if $d_i$ exceeds the threshold, a determination may be made as to whether other conflicts exist (806). For example, within the distance $d_i$, a determination of whether a conflict between the Paging Indicator Channel (PICH) and the SIB exists (806.) If a conflict exists, a conflict resolution algorithm is performed (818) and at least one modified sleep time is determined (820). The process may then proceed to increment a counter i so the next $d_{i+1}$ may be computed with the next adjacent SIB pair (810). If a conflict does not exist in block 806, a sleep time may be established between SFN $n_i$ and $n_{i+1}$ (808). As before, control may flow to block 810 to increment the counter i so the subsequent SIB pair is processed to compute $d_{i+1}$ (808). A check may then be performed to determine if a SIB has been decoded (812). If so, then the SIB scheduling bit map is updated (814) so that the previously decoded SIB is not decoded again. The SIB scheduling bitmap may be updated by the RRC, and the updated bitmap may be passed to L1 through pipe 520. L1 may then recalculate the sleep time intervals based upon the updated bitmap. A final check can be performed to determine if the SIBs indicated in the bit map have been processed (816). If not, then the process returns to block 802 to compute $d_{i+1}$.

Figure 9:
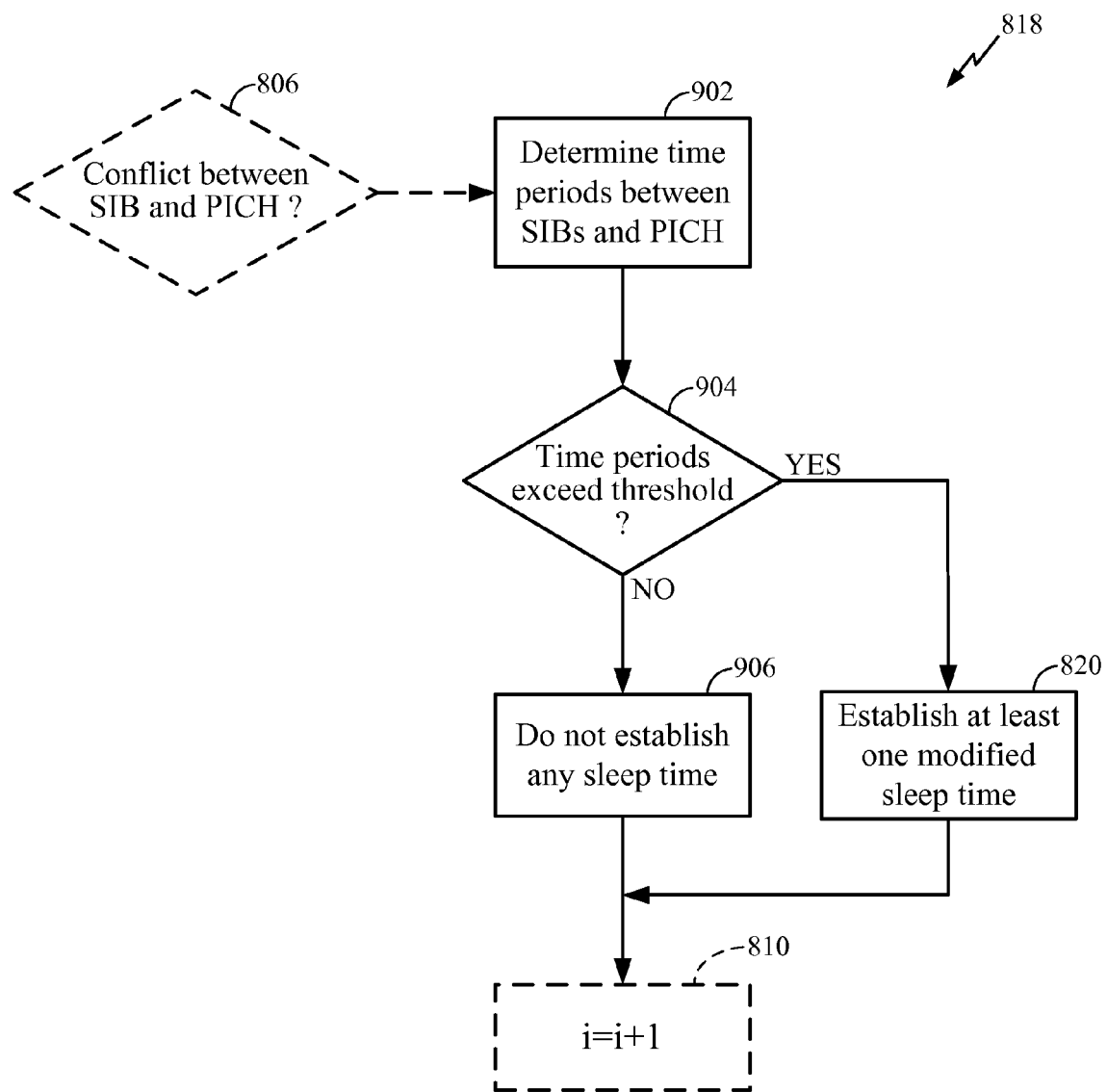
FIG. 9 is a flowchart showing blocks for conflict resolution with Page Indication Channel (PICH) and SIBs.

FIG. 9 is a flowchart illustrating a conflict resolution process (e.g., block 818 and block 820). The conflict resolution process may be used to prevent the UE 105 from going to sleep during a period of time when it should be awake to process other interrupts. The interrupts may come from one or more channels (e.g., they may come from the serving cell over the S-BCCH and/or from the neighboring cell over the N-BCCH), and they may also be non-deterministic and/or asynchronous with data being received over the N-BCCH. The conflict resolution process may be computed based upon SFNs over one or more channels, and upon each channel's respective warm-up and tear-down times. If the SFNs over multiple channels are involved, the SFNs may have to be synchronized prior to performing conflict resolution. This synchronization process may be performed in L1.

Further referring to FIG. 9, one exemplary conflict which the UE 105 can resolve is between a SIB being received over the N-BCCH and paging indication bits being received over the serving cell PICH. If block 806 determines there is a conflict between a SIB and a PICH, then the time periods between the adjacent SIB and a PICH may be determined (902). These time periods may then be tested to determine if each period are of sufficient duration for placing the UE 105 in a sleep state (904). If so, at least one new modified sleep time is established (820); otherwise, no sleep time is established so the UE 105 does not sleep through the PICH (906). Control may then be returned to block 810. One of ordinary skill in the art would appreciate the conflict resolution process may be performed for a wide variety of interrupts occurring over various channels, such as, for example, S-PCCPCH (serving cell SIBs); CTCH (BMC broadcast); and MICH, MCCH, and MTCH (for MBMS).

Figure 10:
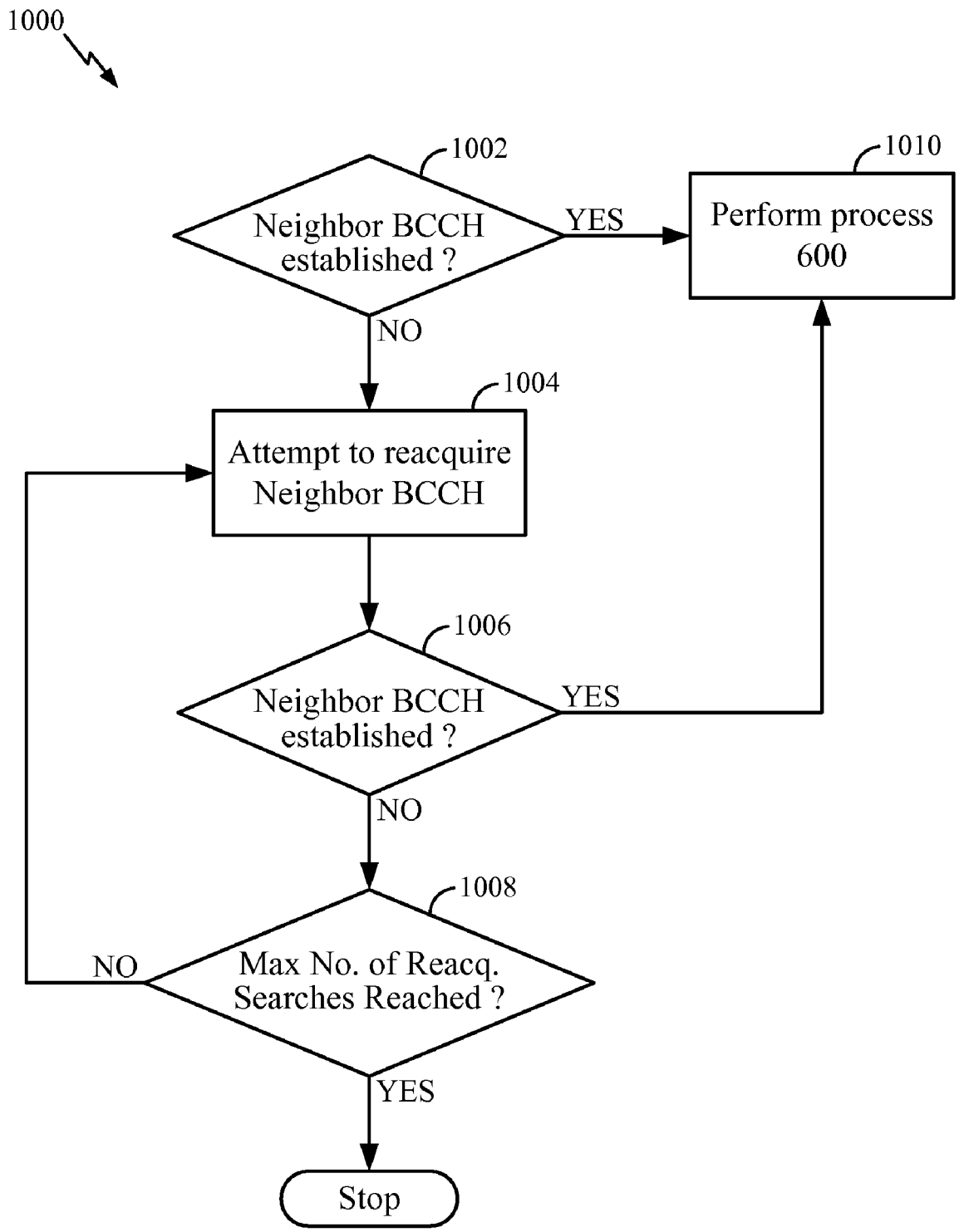
FIG. 10 is a flowchart showing blocks for a Neighbor BCCH reacquisition process.

FIG. 10 is a flowchart illustrating a Neighbor BCCH (N-BCCH) reacquisition process. In the case when a failure occurs during the execution of the ISSO due to neighboring cell 115 reacquisition search failure, the RRC may monitor the number of times the reacquisition search of neighboring cell 115 fails, and abort if this number exceeds a threshold. Initially, the UE 105 determines whether the acquisition of the N-BCCH is successful (1002). If so, the ISSO process 600 is continued (1010). If the N-BCCH was not successfully established, an attempt to reacquire the N-BCCH is made (1004). The UE 105 can determine again whether the acquisition of the N-BCCH is successful (1006). If the reacquisition attempt was not successful, the UE 105 then ascertains whether a maximum number of reacquisition attempts were made (1008). If the maximum number of reacquisition attempts is not reached, the UE 105 attempts to reacquire the N-BCCH (1004). If the maximum number of reacquisition attempts is reached, the UE 105 aborts the attempt to reacquire the N-BCCH. In an embodiment, this maximum number may be set at two consecutive search fails. If the maximum number is reached, the ISSO process is terminated. If the maximum number is not reached, then the ISSO process will continue. In other embodiments, the UE 105 will search for a new neighboring cell if the signal strength from the existing neighboring cell 115 falls below a threshold, and/or if a Block Error Rate (BLER) of data being decoded by L1 exceeds a predetermined threshold.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of embodiments of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for invoking sleep states within user equipment. For example, the method can include receiving a broadcast control channel from a cell, determining an SIB schedule associated with the cell, determining sleep time intervals based upon the SIB schedule, and placing the UE in a sleep state using the sleep time intervals. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. For example, while the ISSO is described above in the context of neighboring cell reselection, at power up and/or any change in SIB state, the ISSO may be utilized to improve the power efficiency during serving cell selection. The UE 105 may store SIB information after the serving cell is first acquired, and optimize SIB collection upon serving cell selection, or when there is a change in the parameters of the serving cell. For example, when the UE reestablishes the serving cell BCCH (S-BCCH), the UE 105 may not have to reread previously decoded SIB over S-BCCH, but rather may read only SIBs which have changed. This approach avoids having to read all of the SIBs over again. Moreover, the ISSO can be implemented for other conditions which are not expressly described herein.

The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

Appendix A: Detailed SIB Scheduling Bit Map Example

After RRC instructs L1 to establish N-BCCH, RRC may decode the Primary Common Control Physical Channel (PC-CPCH) frames received from L1 and may ignore the SIBs until the MIB is successfully decoded. RRC may then generate the SIB Scheduling Database (SSD) based on the scheduling information in the MIB. As soon as the SSD is ready, RRC may share the SSD with the Sleep Manager (SM) which can be part of L1 and may also inform L1 that the SSD is available. The SSD can include 2048 memory locations each carrying 1 or 0. Having a 1 in a memory location n, means that the UE 105 needs to decode the BCCH starting at SFN 2n and having a 0 means that the UE 105 does not need to decode SFNs 2n and 2n+1. Alternatively, SSD can comprise of 4096 memory locations each carrying 1 or 0. Having a 1 in a memory location m, means that UE needs to decode the BCCH starting at SFN m and having a 0 means that UE does not need to decode SFN m.

When a SIB or Scheduling Block (SB) is expected to be repeated more than once during one SFN cycle, RRC may assign 1 to all such SIB or SB occurrences during the whole SFN cycle. RRC may assign 0 to all the memory locations at which N-BCCH does not need to be decoded.

Since at any given time, there is only one N-BCCH being decoded, only one SSD may exist.

RRC may compute the SSD from the scheduling information in the MIB and SBs which contain the offset SIB_OFF, SIB_REP, and SEG_COUNT, for each SIB type.

RRC may compute the number of occurrences of SIB i or scheduling blocks as:

$$N[i] = 1 + \left\lfloor \frac{4094 - 2\text{SIB\_OFF}(i, \text{SEG\_COUNT}[i] - 1)}{\text{SIB\_REP}[i]} \right\rfloor$$

where SIB_OFF(i,SEG_COUNT[i]−1) represents the offset of the last segment of SIB i or scheduling block and SIB_REP[i] represents its period. Here, $\lfloor x \rfloor$ is the largest integer not greater than x.

If the SFNs corresponding to different segments of a SIB or SB are not explicitly given in the MIB, then RRC may compute the starting SFN of the jth segment of the kth occurrence of SIB i and the SBs as the following pseudo code:

SFN(i, 0, k)=2SIB_OFF(i, 0)+(k−1)*SIB_REP[i] for
  k=1, . . . , N[i];

I If SFN(i, 0, k)mod 8==0; then SFN(i, 0, k)=SFN
  (i,0,k)+2;

f SFN(i, j, k)=SFN(i, j−1, k)+2 for j=1, . . . ,SEG_
  COUNT[i]−1.

If SFN(i, j, k)mod 8==0; then SFN(i, j, k)=SFN
  (i, j, k)+2;

a

If any segment of a SIB happens to be at an SFN carrying MIB then that segment may be added by two SFNs unless it is explicitly given at that particular SFN, which may then be multiplexed with MIB.

RRC may inform L1 as soon as SSD is available. RRC may also inform L1 whenever SSD gets updated through the following two scenarios:

When a particular SIB type is successfully decoded, RRC
  may update SSD by removing the wakeup indicators corresponding to that particular SIB and shall inform L1 about
  the updated SSD.

Also, if RRC decodes SBs, then RRC may update the SSD based on the information extracted from such SBs and may inform L1.

If a SIB collection abort is received, RRC may instruct L1 to tear down the N-BCCH.

This feature may not change the procedure that leads to establishing the N-BCCH for collecting SIBs before cell reselection during idle mode.

After N-PCCPCH setup, once L1 receives the indicator with regard to availability or an update in SSD from RRC, L1 may call the SM and shall compute and update whether it can go to sleep or not. If it could go to sleep, L1 may also compute and update the Time To Wake up (TTW) based on the following parameters:

Warm-up Time (WU), Setup Time (SU), and Teardown Time (TD) for N-PCCPCH
Minimum Sleep Duration(s)
The time when the next earliest SIB is scheduled from the current time ($t_1$)
PICH Warm up Time (PWU), PICH Setup Time (PSU), and PICH Teardown Time (PTD)
The time when the next PICH is scheduled from the current time ($t_2$)
The duration of consecutive N-PCCPCH frames carrying SIB contents ($d_1$) in terms of the number of consecutive 1's in the SSD starting from the next earliest scheduled SIB from the current time ($t_0$).

SM may initialize its copy of the SSD by all 1's.
SM may provide L1 with $t_1$, $d_1$, and $t_2$ as soon as L1 calls it.
L1 may compute the parameters $T_{SP}$, and $T_{PS}$, as $$T_{SP} = TD + s + PWU \text{ ms}$$

$$T_{PS} = PTD + s + WU \text{ ms}$$

Before L1 goes to sleep after demodulating a PICH or SIB at the current time ($t_0$), L1 may also call SM and may compute and update whether it can go to sleep or not, and if yes, may compute and update TTW as well.

In the following $t_x$=TD or PTD depending on whether L1 has been demodulating an SIB or PICH before being ready to go to sleep at time $t_0$, respectively.

If $t_1 <= t_2$, then L1 shall compute $T_1 = t_1 - (t_0 + t_x)$ and $g_1 = t_2 - (t_1 + 20d_1)$. Then:

If $T_1 >= s + WU$ and $g_1 >= T_{SP}$, go to sleep and
$TTW = t_1 - WU$.

Else If $T_1 >= s + WU$ and $g_1 < T_{SP}$, go to sleep and
$TTW = t_1 - WU - [(PSU - (t_2 - t_1))U(PSU - (t_2 - t_1))]$,
where $U(x) = 1$ if $x >= 0$ and $U(x) = 0$ if $x < 0$.

Else If $T_1 < s + WU$, do not go to sleep.

Else L1 shall compute $T_2 = t_2 - (t_0 + t_x)$ and $g_2 = t_1 - t_2$. Then:

If $T_2 >= s + PWU$ and $g_2 >= T_{PS}$, go to sleep and
$TTW = t_2 - PWU$.

Else If $T_2 >= s + PWU$ and $g_2 < T_{PS}$, go to sleep and
$TTW = t_2 - PWU - [(SU - (t_1 - t_2))U(SU - (t_1 - t_2))]$.

Else If $T_2 < s + WU$, do not go to sleep.

End

Care should be taken that for SIB the UE 105 uses the appropriate parameters which can take a longer time compared to PICH. However, this longer time is embedded in WU as opposed to shorter PWU.

When there are no more 1's in the SSD, L1 shall go to sleep unless a PICH occasion has been scheduled where L1 shall follow PICH sleep/wake up procedure as already implemented.

If L1 could not acquire an N-BCCH due to neighbor reacquisition search failure, L1 can use the previous positions of the neighbor PSC in order to demodulate N-PCCPCH.

What is claimed is:

1. A method for invoking a sleep state within a user equipment (UE), comprising:
   decoding a broadcast control channel from a cell;
   decoding a System Information Block (SIB) schedule that is associated with the cell based on information received on the decoded broadcast control channel;
   determining sleep time intervals based upon the SIB schedule;
   placing the UE in the sleep state based on the sleep time intervals;
   establishing a SIB scheduling database using the SIB schedule, wherein the database contains a SIB scheduling bit map; and
   determining a duration of time between adjacent SIBs which are to be decoded based upon the SIB scheduling bit map.

2. The method of claim 1, further comprising:
   establishing the sleep time intervals if a duration exceeds a threshold for entering the sleep state.

3. The method of claim 2, further comprising:
   determining if a conflict exists within the duration, wherein the conflict exists if the UE is to be awake within the duration; and
   modifying the sleep time intervals if the conflict exists.

4. The method according to claim 3, wherein modifying the sleep time intervals further comprises:
   determining a first time period and a second time period between an event that causes the conflict and adjacent SIBs;
   determining if each of the time periods exceeds the threshold for entering the sleep state; and
   modifying the sleep time intervals to include at least one modified sleep time duration based upon the determination of at least one period exceeding the threshold.

5. The method according to claim 4, wherein the event is a Page Indication Channel (PICH) request.

6. The method according to claim 1, further comprising:
   determining if at least one of the SIBs has been decoded; and
   updating the SIB scheduling bit map based on at least one of the decoded SIBs.

7. A method for invoking a sleep state within a user equipment (UE), comprising:
   decoding a broadcast control channel from a cell;
   decoding a System Information Block (SIB) schedule that is associated with the cell based on information received on the decoded broadcast control channel;
   determining sleep time intervals based upon the SIB schedule;
   placing the UE in the sleep state based on the sleep time intervals, wherein the cell is a neighboring cell or a serving cell, and
   reading a set of SIBs over a period, based upon a predetermined event, the predetermined event comprising at least one of:
   powering-up the UE,
   performing a cell selection,
   detecting a MIB value tag change,
   detecting an out-of-service condition, or
   performing a cell reselection.

8. A method for invoking a sleep state within a user equipment (UE), comprising:
- decoding a broadcast control channel from a cell;
- decoding a System Information Block (SIB) schedule that is associated with the cell based on information received on the decoded broadcast control channel;
- determining sleep time intervals based upon the SIB schedule;
- placing the UE in the sleep state based on the sleep time intervals;
- establishing a connection from a Radio Resource Control layer to a physical layer;
- calculating the SIB schedule in the Radio Resource Control layer based upon at least one frame provided from the physical layer;
- providing the SIB schedule to the physical layer; and
- calculating the sleep time intervals in at least one of the physical layer or Radio Resource Control layer, based upon the SIB schedule.

9. The method of claim 8, further comprising:
- updating the SIB schedule in the Radio Resource Control layer based upon collected SIBs;
- passing the updated SIB schedule to the physical layer; and
- rescheduling the sleep time intervals in the physical layer based upon the updated SIB schedule.

10. An apparatus for invoking a sleep state within a user equipment (UE), comprising:
- a processor;
- logic configured to decode a broadcast control channel from a cell;
- logic configured to determine a System Information Block (SIB) schedule that is associated with the cell based on information received on the decoded broadcast control channel;
- logic configured to determine sleep time intervals based upon the SIB schedule;
- logic configured to place the UE in the sleep state based on the sleep time intervals,
- logic configured to establish a SIB scheduling database using the SIB schedule, wherein the database contains a SIB scheduling bit map; and
- logic configured to determine a duration of time between adjacent SIBs, which are to be decoded based upon the SIB scheduling bit map.

11. The apparatus of claim 10, further comprising:
- logic configured to establish the sleep time intervals if a duration exceeds a threshold for entering the sleep state.

12. The apparatus according to claim 11, further comprising logic configured to establish at least one modified sleep time if a conflict does exist including:
- logic configured to determine if a conflict exists within the duration, wherein the conflict exists if the UE is to be awake within the duration; and
- logic configured to modify the sleep time intervals if the conflict exists.

13. The apparatus according to claim 12, wherein the logic configured to modify the sleep time intervals further comprises:
- logic configured to determine a first time period and a second time period between an event that causes the conflict and the adjacent SIBs;
- logic configured to determine if each of the time periods exceeds the threshold for entering the sleep state; and
- logic configured to modify the sleep time interval to include at least one modified sleep time duration based upon the determination of at least one period exceeding the threshold.

14. The apparatus according to claim 13, wherein the event is a Page Indication Channel (PICH) request.

15. An apparatus for invoking a sleep state within a user equipment (UE), comprising:
- a processor;
- logic configured to decode a broadcast control channel from a cell;
- logic configured to determine a System Information Block (SIB) schedule that is associated with the cell based on information received on the decoded broadcast control channel;
- logic configured to determine sleep time intervals based upon the SIB schedule;
- logic configured to place the UE in the sleep state based on the sleep time intervals;
- logic configured to read a set of SIBs over a period, based upon a predetermined event, the predetermined event comprising at least one of:
  - power being applied to the UE,
  - a cell selection,
  - a MIB value tag change,
  - an out-of-service condition, or
  - a cell reselection.

16. A non-transitory computer readable medium including instructions stored thereon, comprising:
- a first set of instructions for decoding a broadcast control channel from a cell;
- a second set of instructions for determining a System Information Block (SIB) schedule that is associated with the cell based on information received on the decoded broadcast control channel;
- a third set of instructions for determining sleep time intervals of a user equipment (UE) based upon the SIB schedule;
- a fourth set of instructions for placing the UE in a sleep state based on the sleep time intervals;
- a fifth set of instruction for establishing a SIB scheduling database using the SIB schedule, wherein the database contains a SIB scheduling bit map; and
- a sixth set of instructions for determining a duration of time between adjacent SIBs which are to be decoded based upon the SIB scheduling bit map.

17. A non-transitory computer readable medium including instructions stored thereon, comprising:
- a first set of instructions for decoding a broadcast control channel from a cell;
- a second set of instructions for determining a System Information Block (SIB) schedule that is associated with the cell based on information received on the decoded broadcast control channel;
- a third set of instructions for determining sleep time intervals of a user equipment (UE) based upon the SIB schedule;
- a fourth set of instructions for placing the UE in a sleep state based on the sleep time intervals;
- a fifth set of instructions for establishing the sleep time intervals if a duration exceeds a threshold for entering the sleep state;
- a sixth set of instructions for determining if a conflict exists within the duration, wherein the conflict exists if the UE is to be awake within the duration; and
- a seventh set of instructions for modifying the sleep time intervals, if the conflict exists.

18. A system for invoking a sleep state within a user equipment (UE), comprising:
- means for decoding a broadcast control channel from a cell;
- means for decoding a System Information Block (SIB) schedule that is associated with the cell based on information received on the decoded broadcast control channel;
- means for determining sleep time intervals based upon the SIB schedule;
- means for placing the UE in the sleep state based on the sleep time intervals;
- means for establishing a SIB scheduling database using the SIB schedule, wherein the database contains a SIB scheduling bit map; and
- means for determining a duration of time between adjacent SIBs which are to be decoded based upon the SIB scheduling bit map.

19. The system of claim 18, further comprising:
- means for establishing the sleep time intervals if a duration exceeds a threshold for entering the sleep state.

20. The system of claim 19, further comprising:
- means for determining if a conflict exists within the duration, wherein the conflict exists if the UE is to be awake within the duration; and
- means for modifying the sleep time intervals if the conflict exists.

21. The system according to claim 20, wherein the means for modifying the sleep time intervals comprises:
- means for determining a first time period and a second time period between an event that causes the conflict and adjacent SIBs;
- means for determining if each of the time periods exceeds the threshold for entering the sleep state; and
- means for modifying the sleep time intervals to include at least one modified sleep time duration based upon the determination of at least one period exceeding the threshold.

22. The system according to claim 21, wherein the event is a Page Indication Channel (PICH) request.

23. The system according to claim 18, further comprising:
- means for determining if at least one of the SIBs has been decoded; and
- means for updating the SIB scheduling bit map based on at least one of the decoded SIBs.

24. A system for invoking a sleep state within a user equipment (UE), comprising:
- means for decoding a broadcast control channel from a cell;
- means for decoding a System Information Block (SIB) schedule that is associated with the cell based on information received on the decoded broadcast control channel;
- means for determining sleep time intervals based upon the SIB schedule;
- means for placing the UE in the sleep state based on the sleep time intervals, wherein the cell is a neighboring cell or a serving cell; and
- means for reading a set of SIBs over a period, based upon a predetermined event, the predetermined event comprising at least one of:
  - powering-up the UE,
  - performing a cell selection,
  - detecting a MIB value tag change,
  - detecting an out-of-service condition, or
  - performing a cell reselection.

25. A system for invoking a sleep state within a user equipment (UE), comprising:
- means for decoding a broadcast control channel from a cell;
- means for decoding a System Information Block (SIB) schedule that is associated with the cell based on information received on the decoded broadcast control channel;
- means for determining sleep time intervals based upon the SIB schedule;
- means for placing the UE in the sleep state based on the sleep time intervals; means for establishing a connection from a Radio Resource Control layer to a physical layer;
- means for calculating the SIB schedule in the Radio Resource Control layer based upon at least one frame provided from the physical layer;
- means for providing the SIB schedule to the physical layer; and
- means for calculating the sleep time intervals in at least one of the physical layer or Radio Resource Control layer, based upon the SIB schedule.

26. The system of claim 25 further comprising:
- means for updating the SIB schedule in the Radio Resource Control layer based upon collected SIBs;
- means for passing the updated SIB schedule to the physical layer; and means for rescheduling the sleep time intervals in the physical layer based upon the updated SIB schedule.

27. A system for invoking a sleep state within a user equipment (UE), comprising:
- means for decoding a broadcast control channel from a cell;
- means for determining a System Information Block (SIB) schedule that is associated with the cell based on information received on the decoded broadcast control channel;
- means for determining sleep time intervals of the UE based upon the SIB schedule;
- means for placing the UE in a sleep state based on the sleep time intervals;
- means for establishing the sleep time intervals if a duration exceeds a threshold for entering the sleep state;
- means for determining if a conflict exists within the duration, wherein the conflict exists if the UE is to be awake within the duration; and means for modifying the sleep time intervals, if the conflict exists.

* * * * *